United States Patent Office 3,223,686
Patented Dec. 14, 1965

3,223,686
POLYMERS OF VINYL ORGANIC MONOMERS AND PROCESS FOR PRODUCING THE SAME
Giulio Natta, Giorgio Mazzanti, Paolo Longi, and Francesco Bernardini, all of Milan, Italy, assignors to Montecatini Società Generale per l'Industria Mineraria e Chimica, a corporation of Italy
No Drawing. Filed Dec. 19, 1958, Ser. No. 781,425
Claims priority, application Italy, Dec. 23, 1957, 18,327/57; Apr. 3, 1958, 5,134/57
18 Claims. (Cl. 260—80)

This invention relates to new, high molecular weight, linear polymers of certain vinyl organometallic monomers, and to a method for producing the same. More particularly, the invention relates to such polymers of vinyl monomers containing in the molecule at least one atom of a metal of Group IV of the Mendeleeff Periodic Table bound to carbon atoms.

It has been reported (A. D. Petrov et al., Dokladi Akad. Nauk S.S.S.R. 99, 7858, 1954; C.A. 49, 15728, 1955) that low molecular weight, oily polymers having an irregular structure and consisting prevailingly of tetramers or pentamers can be obtained by polymerizing vinyl monomers containing silicon under very high pressures (5500 atm.) in the presence of radical type initiators. The production of low molecular weight polymers by cationic polymerization of those vinyl monomers containing silicon has also been reported (L. H. Sommer et al., J. Am. Chem. Soc. 70, 2872, 1948).

No high molecular weight, linear, regular polymers of vinyl monomers containing in their molecule atoms of metals belong to Group IV of the Mendeleeff Periodic Table have been known heretofore.

One object of this invention is to provide new, high molecular weight polymers of the vinyl monomers containing at least one atom of a Group IV metal bound to carbon atoms, which polymers are characterized by a substantially regular, linear structure.

Another object is to provide a process for producing said high molecular weight linear polymers.

We have found that these and other objects are accomplished by the coordinanted anionic polymerization of monomers of the specified type, and particularly of monomers having the general formula

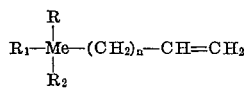

in which Me is an element selected from the 2nd subgroup of Group IV of the Mendeleeff Periodic Table, that is Me is silicon, germanium, or tin, $n$ is comprised between 0 and 4, and R, $R_1$, and $R_2$ are the same or different aliphatic, alicyclic or aromatic radicals which may contain from 1 to 12 carbon atoms.

When Me represents silicon, the monomers can have the formula

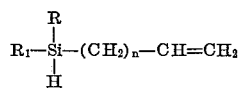

in which R and $R_1$ are hydrogen or lower alkyl groups.

Among the monomers comprised in the general formulae given and which are polymerized to high, linear polymers according to this invention may be mentioned the alkyl, alkyl-aryl, and aryl-substituted vinyl-, allyl-, butenyl-, and pentenyl-silanes and germanes, as well as the corresponding derivatives of tin. Compounds in which one or more of R, $R_1$ and $R_2$ are hydrogen include, for example, vinyl-, allyl-, butenyl-, pentenyl-, and hexenyl-silane and the corresponding compounds in which one or two of R, $R_1$ and $R_2$ represent the same or different organic radicals.

Examples of the first group of compounds are: trimethyl-vinylsilane; 5(trimethylsilyl)pentene-1; 4(trimethylsilyl)butene-1; 5(triphenylsilyl)pentene-1; 4(triphenylsilyl)butene-1; 4(tricyclohexyl-silyl)butene-1; 5(tricyclohexyl-silyl)pentene-1; tri(i-propyl)allylsilane; 5(tri-i-propyl-silyl)pentene-1; 5(trimethylstannyl)pentene-1; 4(trimethyl-stannyl)butene-1; 5(triphenylstannyl)pentene-1; 4(tri-i-propylstannyl)butene-1.

Examples of the second group of compounds are: methylvinylsilane; methylallylsilane; dimethylallylsilane; 4(methylsilyl)butene-1; 5(methylsilyl)pentene-1; 5(dimethylsilyl)pentene-1; 4(dimethylsilyl)butene-1; ethylallylsilane; diethylallylsilane.

In accordance with this invention the coordinated anionic polymerization of these vinyl monomers is carried out by contacting the monomer, under polymerization conditions, with a catalyst prepared from a compound of a transition metal belonging to Groups IV to VI inclusive of the Mendeleeff Periodic Table and an organometallic compound of an element belong to Groups I to III, inclusive, of said table.

The transition metal compound used in preparing the catalyst may be, for example, a halide of titanium, zirconium, hafnium, thorium, vanadium, tantalum, niobium, chromium, molybdenum, tungsten and uranium.

The organometallic compound may be an alkyl compound of lithium, or of beryllium, magnesium, zinc, cadmium or other element of the 2nd group, or of boron, aluminum or other element of the 3rd group.

The catalysts used are those such as have been disclosed by Natta et al., in the literature, and in, e.g., U.S. Patents Nos. 3,112,300; 3,112,301, and 3,141,872 as effective catalysts for the polymerization of alpha-olefins such as propylene, butene-1 and styrene, to polymers which have a linear, regular head-to-tail structure. Such catalysts include those prepared from compounds, e.g., halides, of the transition metals in which the metal has a valency higher than 3 (at least 4) e.g., TiCl$_4$, as well as the stereospecific catalysts of Natta et al. which are prepared starting with solid, highly crystalline halides of the transition metals in which the metal has a valency not higher than 3, e.g., TiCl$_3$.

As Natta et al. have shown, the catalysts of the last-mentioned type, e.g. those prepared from TiCl$_3$ and triethyl aluminum, effect a stereospecific polymerization of the alpha-olefins and orient the polymerization of those monomers to the production of crude polymerizates which prevailingly consist of isotactic macromolecules and are highly crystalline.

Our new polymers of the vinyl organometallic monomers are substantially head-to-tail, high molecular weight products containing substantially no branches longer than the —(CH$_2$)$_n$—Me R, R$_1$, R$_3$ groups.

It is surprising that the vinyl organometallic monomers of the present type can be polymerized effectively with the catalysts used by Natta et al. for polymerization of the alpha-olefins because all previous attempts to polymerize aliphatic monomers containing elements other than carbon and hydrogen with those catalysts have been unsuccessful.

For example, although polymerization of some vinyl monomers, for instance vinyl chloride, is initiated by the catalysts prepared from the transition metal and organometallic compounds of the Group I–III metals, the polymerization is accompanied by progressive poisoning of the catalyst. Polymers having the regularity of structure which is characteristic of the alpha-olefin polymers obtained by Natta et al. with these catalysts have never been obtained heretofore from vinyl monomers of this type. It had been observed that elements other than carbon and hydrogen (e.g. halogen, nitrogen, sulfur, oxygen) when present in the monomer usually act as poisons for the catalysts prepared from the transition metal and organometallic compounds of the metals of Groups I–III.

Also, it had been noted that monomers containing heavy metals tend to react with the organometallic compounds contained in those catalysts and are, in general, reduced by them.

The production of the present polymers from the vinyl monomers containing atoms of Group IV metals in the molecule, using the catalysts prepared from the transition metal compounds and the organometallic compounds of the Group I–III metals, is therefore surprising.

It is also surprising that the vinyl monomers as defined herein can be polymerized in a stereospecific way to high molecular weight polymers which are highly crystalline at the X-rays.

The crude polymers we obtain by the stereospecific polymerization of vinyl monomers of the type disclosed herein show, in general, a crystallinity by X-ray examinations which is higher than 40%. The crystallinity of the polymers is due to the presence therein of isotactic macromolecules as defined by Natta et al., i.e., macromolecules which have, for substantially the main chain, the Natta et al. isotactic structure. Such structure is characterized by the fact that the tertiary carbon atoms in successive monomeric units making up the main chain of the macromolecule have the same steric configuration on the same chain section.

When the catalyst used is one prepared from a transition metal compound in which the metal has a valency higher than 3 (at least 4) and the organometallic compound, such as the catalyst prepared from titanium tetrachloride and triethyl aluminum, the crude polymerizate we obtain usually comprises a mixture of the structurally regular isotactic macromolecules, stereoblock macromolecules of lower crystallinity, and non-crystallizable macromolecules of less regular structure and of the Natta et al. atactic type.

In general the obtained polymers have high molecular weights, which can vary between about 1000 and 30,000 for the atactic polymers, and between 5000 and about 200,000 for the isotactic polymers.

These mixtures can be fractionated by extraction with selective organic solvents for the different types of macromolecules, as shown in the examples below. Preferably, the extraction of the different macromolecule types is carried out at a temperature at least 10° C. lower than the lowest melting point of the fraction to be isolated as the residue of that particular extraction.

The polymerization is preferably carried out in a hydrocarbon solvent chemically inert to the catalyst and at temperatures of 20° to 180° C., preferably of 50° C. to 150° C. Suitable solvents include n-heptane, pentane, iso-octane, etc. The polymerization can be effected at atmospheric pressure or at slightly increased pressure.

The highly crystalline polymers obtained from monomers of the type $SiH_3(CH_2)_n$—$CH=CH_2$ have a melting point which is practically the same as that of the highly crystalline polymers obtained from the corresponding hydrocarbon monomers.

For instance, isotactic poly-(allylsilane) melts at 128° C. while, as shown by Natta et al. isotactic polybutene-1 has a melting point between 125° C. and 135° C.

The high melting point of our isotactic polymers, and their low solubility, can result, in practice, in a certain slowness of the rate at which the polymerization proceeds, because of the slow diffusion of the monomer to the surface of the heterogeneous catalyst on which the polymeric chains grow.

For that reason, even when isotactic polymers are desired, it may be preferable to use those catalysts of the type aforesaid which have a higher dispersibility in the inert hydrocarbon used as the polymerization medium, than do the highly stereospecific catalysts prepared from, e.g., $TiCl_3$ and $Al(C_2H_5)_3$.

Natta et al. have shown that when the catalysts which are highly dispersible in the inert hydrocarbon, such as the catalysts prepared from titanium tetrahalides and organometallic compounds of elements of Groups I–III of the Mendeleeff Periodic Table, are used for the polymerization of alpha-olefins such as propylene, the crude polymerizates obtained comprise a mixture of stereoisomers and exhibit, in general, only a low crystallinity when examined at the X-rays.

In contrast, and surprisingly, when those catalysts based on the high valency transition metal halides are used for the polymerization of the vinyl monomers containing the Group IV metal atom in the molecule according to this invention, the polymerizates obtained, while being mixtures of stereoisomers, comprise a much higher proportion of isotactic macromolecules.

The isotactic polymers of the present invention are of special practical interest because of their high melting point, stability to high temperature, and relatively low flammability.

The new polymers containing silicon are particularly stable to heat, even in the presence of air, and this permits them to be used without damage under conditions where they are exposed to severe temperature conditions at which, for the most part, thermoplastic crystalline polymers cannot be used.

Copolymers of the vinyl monomers as defined herein, with other unsaturated hydrocarbons including olefins and other vinyl monomers can also be produced by the present process. Particularly useful for various applications are the copolymers of the monomers $$SiH_3(CH_2)_n\text{—}CH=CH_2$$

For instance, by copolymerizing allyl-silane with ethylene in accordance with the invention, we obtain high molecular weight amorphous linear copolymers which have the mechanical properties of a non-vulcanized elastomer. Because of the high reactivity of the →Si—H bonds, it is possible to effect cross-linking between the different macromolecules of the copolymers, and obtain a vulcanized rubber.

In the case of some of the polymers, e.g., those containing tin, the macromolecules can be cross-linked rather easily by attacking the Me—C bonds contained therein with hydrochloric acid, even when only a very few of such bonds are attacked. The chlorinated products thus obtained contain reactive groups as a result of which it is possible to form cross-links between the macromolecules by heating the chlorinated products in the presence of polyvalent bases.

Under certain conditions, the polymers containing tin, and also those containing lead, can be decomposed with the release of free radicals which function as cross-linking agent for transforming the thermpolastic polymers having, per se, a high melting point into a vulcanized product consisting of infusible, insoluble tri-dimensional macromolecules.

Another characteristic of our new polymers containing tin or lead is their capacity to react, even at high temperatures, with transistion metal halides to yield reaction products which are catalysts for the polymerization of olefins such as ethylene. It is thus possible to use our new polymers as intermediates for the production of catalysts which initiate the formation of other polymeric chains, e.g., the formation of polyethylene.

The polymerization of the vinyl monomers as defined herein, and which may be regarded as organometallic monomers, can be carried out, also, in the presence of alpha-olefins $CH_2=CHR$ where R is hydrocarbon, i.e., propylene, butene-1, pentene-1, or styrene, or in the presence of diolefins containing at least one vinyl double bond, to obtain mixed polymers which contain in their molecules metal atoms that impart distinctive properties to the products.

Specifically, we can obtain mixed polymers comprising a predominant amount of an alpha-olefin, or of a diolefin containing at least one vinyl double bond, and a small amount of an organo-tin monomer, the latter serving as a heat-stabilizer for the alpha-olefin or diolefin polymer.

The mixed polymers can be used, also, as thermal stabilizers for vinyl polymers generally, such as polyvinylchloride, polyvinylidene chloride, polyvinylacetate, vinylchloride-vinyl acetate copolymers, vinyl chloride-acrylonitrile copolymers, etc. Small amounts of the mixed polymers, usually between 2% and 10% are effective heat-stabilizers for the vinyl resins of the type mentioned.

The following examples are given to illustrate the invention, it being understood that these examples are not intended as limiting.

*Example 1*

Into a 100 cc. glass flask provided with stirrer, dropping funnel and supported in an external oil bath kept at 80° C., 1.37 g. 95% Al($C_2H_5$)$_3$ dissolved in 14 g. trimethylallylsilane are introduced under nitrogen. The stirrer is started and, after about 10 minutes, a solution containing 0.865 g. titanium tetrachloride in 10 cc. anhydrous n-heptane is rapidly added. After 4 hours, 200 cc. methanol and 1.5 cc. concentrated hydrochloric acid are added to the polymerization product. The solid polymer which is separated is washed with methanol and dried under a reduced pressure of 20 mm. Hg, at a temperature of 80° C. The solid polymer thus obtained amounts to 9 g. and is a white powder with a crystallinity of 50%, by X-rays examination.

The polymer contains 24.35% silicon, while the theoretical amount calculated for trimethyl allyl silane corresponds to 24.5%.

By fractionation of the polymer by successive extraction with boiling ether and n-heptane in a Kumagawa extractor, the following factions are obtained:

An ether extract, corresponding to 29.2% of the total polymer, consisting of a head-to-tail atactic linear polymer with an aspect similar to that of a non-vulcanized rubber. The intrinsic viscosity of this fraction, in tetrahydronaphthalene at 135° C., is 0.08.

A heptane extract (2.8%) consisting of a partially crystalline poly(trimethyl allyl silane) having an intrinsic viscosity of 0.35.

A residue, insoluble in boiling n-heptane, corresponding to 68% of the total polymer, consisting of a highly crystalline (by X-rays examination) linear poly-(trimethylallyl silane). This fraction consists of a powdery solid having a melting point of about 290–300° C.

*Example 2*

Into a 70 cc. oscillating autoclave a suspension of 0.5 g. TiCl$_3$ in 16 g. trimethylallylsilane is introduced under nitrogen and 1.15 g. 95% Al($C_2H_5$)$_3$ are added. The mixture is heated to 125° C. while agitating. After some hours the agitation is stopped and, when the autoclave is cold, the polymerization product is discharged.

By operating as described in Example 1, 3.2 g. of a white rubbery product, 10% of which is insoluble in boiling n-heptane and highly crystalline by X-rays examination, are isolated.

*Example 3*

Into a 70 cc. oscillating autocave, 1.1 g. 95% Al($C_2H_5$)$_3$ dissolved in 20 g. triethylallylsilane are introduced under nitrogen, and 0.865 g. TiCl$_4$ dissolved in 20 cc. anhydrous n-heptane are added immediately thereafter. The autoclave is agitated and heated to 125° C.

After some hours the polymerization is stopped and, operating as in Example 1, 0.9 g. solid polymer which is partially crystalline by X-rays examination, are isolated. The crystallinity is due to the presence of macromolecules containing at least long portions with an isotactic structure.

*Example 4*

Into a 70 cc. oscillating autoclave a solution of 1.1 g. triethyl aluminum in 18 g. trimethylallyl tin is introduced under nitrogen.

The autoclave is then heated to the temperature of 85° C. which is kept constant and a solution of 0.86 g. titanium tetrachloride in 10 cc. heptane is introduced. After about 6 hours the polymerization is stopped by introducing 20 cc. butanol.

The polymerization product is then repeatedly washed with methanol and vacuum dried under heating. 8 g. of a solid powdery polymer, having an intrinsic viscosity of 0.9 in tetrahydronaphthalene solution at 135° C. are isolated.

*Example 5*

Into a 600 cc. oscillating autoclave, kept at the constant temperature of 50° C., a solution of 1.1 g. 95% Al($C_2H_5$)$_3$ and 3.5 g. trimethylallyl silane in 100 cc. n-heptane are introduced. After a few minutes a solution containing 0.877 g. VCl$_4$ in 50 cc. n-heptane is added, together with 21 g. propylene.

After 1 hour the initial pressure of 5 atm. has dropped to 1.5 atm. 50 cc. methanol are then added and the rubbery product obtained is purified by treatment with acetone and hydrochloric acid, is washed with methanol many times and finally dried under a pressure of 20 mm. Hg at 80° C.

The white solid reaction product amounts to 22 g., contains 1.67% by weight of silicon, corresponding to a trimethylallyl silane content of 6.8% by weight.

*Example 6*

Into a 100 cc. glass flask provided with stirrer, dropping funnel and a thermostatic bath kept at 75° C., 1 g. Al($C_2H_5$)$_3$ dissolved in 17 g. of 5-trimethylsilyl-pentene-1 is introduced under nitrogen.

The solution is stirred for 10 minutes, 10 g. TiCl$_3$ are added and the whole is stirred for 8 hours. The content of the flask is poured into 300 cc. methanol containing 5 cc. conc. hydrochloric acid. A solid product is isolated, washed with methanol and dried under a reduced pressure at 50° C. The solid fibrous white polymer thus obtained amounts to 4 g.

The fractionation with boiling solvents in a Kumagawa extractor gave the following fractions:

An acetone extract having a wax-like aspect and corresponding to 10.2% of the total polymer;

An ether extract (74.8%) consisting of a partially crystalline head-to-tail linear polymer. The X-ray fiber pattern corresponds to a spiral conformation with ternary symmetry, having an identity period of 6.5 A. which can be ascribed to the presence of isotactic structure;

The intrinsic viscosity of this fraction, in tetrahydronaphthalene at 135° C., is 0.42. The density measured at 30° C. on a sample molded into a lamina is 0.859. The melting point, determined under a polarizing microscope, is 127° C. This fraction contains 18.92% silicon (the theoretical content calculated for a poly-5-(trimethylsilyl) pentene-1 is 19.77%);

A heptane extract (11.3%) consisting of a polymer consisting of macromolecules containing isotactic sections, having an intrinsic viscosity of 1.29, a density of 0.867 at 30° C., and a melting point of 131.5° C.;

A xylene extract corresponding to 3.7% of the total polymer, consisting of a linear poly-5-(trimethylsilyl) pentene-1, highly crystalline by X-ray examinations, having an intrinsic viscosity of 1.73, a density of 0.872 and a melting point of 133° C.

Example 7

In an apparatus similar to that described in the preceding example, 1.8 g. Al(i-$C_4H_9$)$_3$ dissolved in 36 g. trimethyl pentene-5-yl-tin and, after a few minutes, 0.55 g. TiCl$_3$ are introduced.

The mixture is agitated for 10 hours at 80° C. and the polymerization product is then poured into methanol. The solid product thus coagulated is filtered and dried at 50° C. under reduced pressure. The solid product thus obtained amounts to 14 g.

By fractionation with boiling solvents the following fractions are obtained:

An acetone extract, corresponding to 2.9% of the total polymer.

An ether extract (96.2%) consisting of a linear head-to-tail polymer having an aspect similar to that of a non-vulcanized rubber, an intrinsic viscosity of 0.59 (determined in tetrahydronaphthalene at 135° C.) and a density of 1.31, measured at 30° C. This fraction contains 45.2% tin (theoretical content calculated for a poly(trimethylpentene-5-yl-tin)=48.86%).

A heptane extract (0.9%) consisting of a polymer having a fibrous aspect.

Example 8

Into a 250 cc. oscillating autoclave, 1.04 g. Al($C_2H_5$)$_3$ dissolved in 20 cc. n-heptane and 0.5 g. TiCl$_3$ are introduced under nitrogen and a solution of 0.865 g. TiCl$_4$ in 30 cc. n-heptane is then added. The autoclave is agitated and, after a few minutes, 30 g. allyl silane dissolved in 50 cc. anhydrous n-heptane are added. Immediately thereafter the autoclave is heated to 85° C. and is kept at this temperature for 10 hours while agitating.

The polymerization product is then discharged from the autoclave and is completely coagulated with methanol. 20 g. of a solid polymer, still containing a portion of the inorganic products coming from the catalyst, are thus obtained. The crude polymer cannot be purified by treatment with methanol and hydrochloric acid since the latter attacks the polymer with development of hydrogen. The crude polymer is therefore extracted with boiling xylene and the solution, after decantation, is coagulated with methanol.

The poly(allylsilane) is partially crystalline by X-ray examinations and presents a melting point of 128° C.

Example 9

Into a 560 cc. oscillating autoclave kept at the constant temperature of 50° C., 1.04 g. Al($C_2H_5$)$_3$ dissolved in 100 cc. n-heptane and, immediately thereafter, a solution of 0.865 g. TiCl$_4$ in 50 cc. n-heptane are introduced under nitrogen.

The autoclave is agitated and, after 2 minutes, 40 g. of a mixture containing 80% (by weight) mono-allyl silane and 20% ethylene are added. After about 1 hour the polymerization product is discharged from the autoclave and treated as described in Example 1. 20 g. of a solid product, similar to a non-vulcanized rubber and containing about 60% by weight of copolymerized mono-allylsilane (determined from the silicon content) are thus obtained.

Example 10

Into the autoclave described in Example 2, 0.8 g. TiCl$_3$ suspended in 50 cc. anhydrous n-heptane, 1.12 g. 93% Al($C_2H_5$)$_3$ dissolved in 50 cc. n-heptane and, finally, 30 g. allyl silane are introduced under nitrogen.

The autoclave is agitated while gradually heating to 68° C. After 20 hours the pressure drops from the initial value of 1.9 atm. to the final value of 1.2 atm.

After cooling the polymerization product is withdrawn from the autoclave and is purified as described in Example 1. 19 g. of a solid white fibrous polymer are thus obtained.

The foregoing examples clearly demonstrate that by polymerizing the vinyl organometallic monomers with catalysts as disclosed by Natta et al. for alpha-olefin polymerization, it is possible to produce entirely new polymers of those vinyl organometallic monomers which have, in general, high melting points and are useful for the purpose to which thermoplastic resins are adapted.

Various changes and modifications may be made in details in practicing the invention without departing from the spirit thereof. Therefore, it is intended to include in the scope of the appended claims all such modifications and changes as may be apparent to those skilled in the art from the description and examples given herein.

What is claimed is:

1. A linear high molecular weight polymeric product selected from the group consisting of (1) crystalline homopolymers of vinyl monomers of the general formula

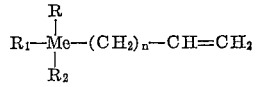

in which Me is a metal selected from the group consisting of silicon and tin, $n$ is an integer from zero to four, R, $R_1$ and $R_2$ being radicals selected from the group consisting of lower alkyl radicals, cycloalkyl radicals, and aryl radicals when Me is tin, R and $R_1$ being selected from the group consisting of lower alkyl radicals, cycloalkly radicals and aryl radicals when Me is silicon, and $R_2$ being selected from the group consisting of lower alkyl radicals, cycloalkyl radicals, aryl radicals and hydrogen when Me is silicon, and being hydrogen when R and $R_1$ are methyl groups and Me is silicon and (2) copolymers of said vinyl monomers with mono-olefins.

2. A polymeric product according to claim 1, characterized in that the vinyl monomer has the general formula

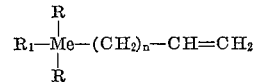

in which Me is silicon, $n$ is an integer from zero to 4, R and $R_1$ are selected from the group consisting of lower alkyl radicals, cycloalkyl radicals and aryl radicals, and $R_2$ is selected from the group consisting of lower alkyl radicals, cycloalkyl radicals, aryl radicals and hydrogen, and is hydrogen when R and $R_1$ are methyl groups.

3. A polymeric product according to claim 1, characterized in that the vinyl monomer has the general formula

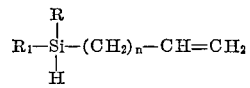

in which R and $R_1$ are selected from the group consisting of hydrogen and lower alkyl radicals containing at least two carbon atoms, and $n$ is an integer from zero to 4.

4. A polymeric product according to claim 1, characterized in that the vinyl monomer is triethylallylsilane.

5. A polymeric product according to claim 1, characterized in that the vinyl monomer is 5-trimethylsilyl-pentene-1.

6. A polymeric product according to claim 1, characterized in that the vinyl monomer is trimethylpentene-5-yl-tin.

7. A polymeric product according to claim 1, characterized in that the vinyl monomer is allyl-silane.

8. High molecular weight, linear homopolymers of triethylallylsilane containing macromolecules having the isotactic structure for at least long sections of the main chain, and having a high melting point.

9. High molecular weight, linear homopolymers of 5-trimethylsilyl-pentene-1, said polymers containing macromolecules having the isotactic structure for at least long sections of the main chain, and having a high melting point.

10. High molecular weight, linear homopolymers of allyl-silane, said polymers containing macromolecules having the isotactic structure for at least long sections of the main chain, and having a high melting point.

11. High molecular weight, linear, amorphous copolymers of allylsilane and ethylene.

12. A process for producing polymers of vinyl monomers having the general formula

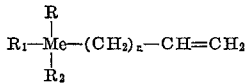

in which Me is a metal selected from the group consisting of silicon and tin, $n$ is an integer from zero to 4, and R, $R_1$ and $R_2$ being selected from the group consisting of lower alkyl radicals, cycloalkyl radicals, and aryl radicals containing from 1 to 12 carbon atoms when Me is tin, and being selected from the group consisting of lower alkyl radicals containing at least two carbon atoms, cycloalkyl radicals, and aryl radicals, and hydrogen when Me is silicon, material to be polymerized, under polymerization conditions and in an inert hydrocarbon solvent, with a catalyst prepared from a compound of a transition metal belonging to Groups IV to VI inclusive of the Mendeleeff Periodic Table and an organometallic compound of an element belonging to Groups I to III of said table.

13. The process according to claim 12, characterized in that the catalyst is prepared from $TiCl_4$ and an alkyl aluminum compound.

14. The process according to claim 12, characterized in that the catalyst is prepared from $TiCl_3$ and an alkyl aluminum compound.

15. The process according to claim 12, characterized in that the vinyl monomer has the formula

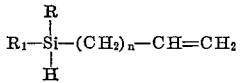

in which $n$ is an integer from zero to 4, and R and $R_1$ are selected from the group consisting of hydrogen and lower alkyl radicals containing at least two carbon atoms.

16. The process according to claim 12, characterized in that the material to be polymerized is a mixture of allylsilane and ethylene.

17. A process for producing crystalline homopolymers of vinyl monomers having the general formula

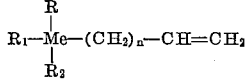

in which Me is a metal selected from the group consisting of silicon and tin, $n$ is an integer from zero to 4, and R, $R_1$ and $R_2$ being selected from the group consisting of lower alkyl radicals, cycloalkyl radicals, and aryl radicals when Me is tin and being selected from the group consisting of lower alkyl radicals containing at least two carbon atoms, cycloalkyl radicals and aryl radicals, and hydrogen, when Me is silicon, which process comprises contacting the vinyl monomer, under polymerization conditions, and in an inert hydrocarbon solvent, with a catalyst prepared from a compound of a transition metal belonging to Groups IV to VIII inclusive of the Mendeleeff Periodic Table and an organometallic compound of an element belonging to Groups I to III inclusive of said table, to obtain a crude polymerizate comprising a mixture of macromolecules some of which have the isotactic structure, and fractionating the crude polymerizate by means of selective organic solvents to separate the macromolecules having the isotactic structure therefrom.

18. High molecular weight, linear homopolymers of vinyl monomers having the general formula

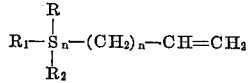

in which $n$ is an integer from zero to four, and R, $R_1$ and $R_2$ are radicals selected from the groups consisting of lower alkyl radicals, cycloalkyl radicals and aryl radicals, said homopolymers containing macromolecules having the isotactic structure for at least long sections of the main chain, and having a high melting point.

References Cited by the Examiner

UNITED STATES PATENTS

| 2,388,161 | 10/1945 | Kropa | 260—80 |
| 2,438,612 | 3/1948 | MacKenzie et al. | 260—80 |
| 2,448,391 | 8/1948 | Pyle | 260—80 |
| 2,512,390 | 6/1950 | Sommer | 260—80 |
| 2,532,583 | 12/1950 | Tyran | 260—80 |
| 2,538,657 | 1/1951 | Rochow | 260—80 |
| 2,595,729 | 5/1952 | Swiss et al. | 260—46.5 |
| 2,728,785 | 12/1955 | Albisetti et al. | 260—80 |
| 2,811,541 | 10/1957 | Curry | 260—80 |
| 2,958,681 | 11/1960 | Campbell | 260—80 |

FOREIGN PATENTS 538,782   12/1955   Belgium.

OTHER REFERENCES

Billmeyer: Textbook of Polymer Chemistry (New York: Interscience Publishers, 1957) (pages 21 to 23, 32, 33).

Polyakova et al.: Chemical Abstracts, vol. 51, page 4979 (1957).

Stille: Chemical Reviews, vol. 58, pages 556–558, June 1958.

Sommer et al.: J.A.C.S., vol. 70, pp. 2872–2874 (1948).

Bailey et al. Abstract of Papers, 111th Meeting, American Chemical Society, Apr. 14–18, 1947, pp. 30M–31M.

JOSEPH L. SCHOFER, *Primary Examiner.*

MILTON STERMAN, P. E. MANGAN, *Examiners.*